United States Patent
Schoon

(10) Patent No.: US 8,133,143 B2
(45) Date of Patent: Mar. 13, 2012

(54) GEAR REDUCER ELECTRIC MOTOR ASSEMBLY WITH INTERNAL BRAKE

(75) Inventor: Benjamin Warren Schoon, Layfayette, IN (US)

(73) Assignee: Fairfield Manufacturing Company, Inc., Lafayette, IN (US)

( * ) Notice: Subject to any disclaimer, the term of this patent is extended or adjusted under 35 U.S.C. 154(b) by 611 days.

(21) Appl. No.: 12/255,292

(22) Filed: Oct. 21, 2008

(65) Prior Publication Data

US 2009/0312134 A1 Dec. 17, 2009

Related U.S. Application Data

(60) Provisional application No. 61/073,021, filed on Jun. 16, 2008, provisional application No. 61/097,456, filed on Sep. 16, 2008.

(51) Int. Cl.
*F16H 57/10* (2006.01)
*F16H 1/46* (2006.01)

(52) U.S. Cl. ......... 475/156; 475/311; 475/5; 180/65.51; 180/371; 180/372

(58) Field of Classification Search ................. 475/156, 475/311, 5; 180/371, 372, 65.51
See application file for complete search history.

(56) References Cited

U.S. PATENT DOCUMENTS

| | | |
|---|---|---|
| 1,570,356 A | 1/1926 | Lane |
| 3,214,989 A | 11/1965 | Wellauer et al. |
| 3,767,013 A | 10/1973 | Caldwell |
| 3,848,702 A | 11/1974 | Bergman |
| 4,018,097 A | 4/1977 | Ross |
| 4,031,780 A | 6/1977 | Dolan et al. |
| 4,050,544 A | 9/1977 | Kalyan et al. |
| 4,051,922 A | 10/1977 | Sukle |
| 4,057,126 A | 11/1977 | Stephens |
| 4,090,588 A | 5/1978 | Willover |
| 4,121,694 A | 10/1978 | Nelson |
| 4,170,549 A | 10/1979 | Johnson |
| 4,221,279 A | 9/1980 | Jones et al. |

(Continued)

FOREIGN PATENT DOCUMENTS

DE 100621221 A1 6/2002

(Continued)

OTHER PUBLICATIONS

Fairfield Manufacturing Company Inc., Torque-Hub product descriptions and selection guides published before 2007 at http://fairfieldmfg.com/, retrieved on Jun. 8, 2011 from Internet Archives WayBack Machine Beta, http://web.archive.org/. PDF document, 24 pages.*

(Continued)

*Primary Examiner* — Justin Holmes
*Assistant Examiner* — Jacob S Scott
(74) *Attorney, Agent, or Firm* — Woodling, Krost and Rust

(57) ABSTRACT

A compact gear reducer electric motor assembly with an internal brake disclosed and claimed wherein a high speed electric motor is interconnected with a gear reducer having substantial gear reduction. The assembly includes a spindle, a brake mounted substantially within said high speed electric motor and operable against a spring biasing said brake into engagement with ground. The brake is electrically actuated to permit transmission of energy to the gear reducer. The gear reducer includes an input, intermediate and output planetary stages. The input and intermediate stages residing within the spindle, and, the output planetary stage drives an output ring gear. Releasing means for releasing the output ring gear from the brake allowing rotation thereof.

8 Claims, 12 Drawing Sheets

U.S. PATENT DOCUMENTS

| | | | |
|---|---|---|---|
| 4,222,283 | A | 9/1980 | Nagy |
| 4,327,950 | A | 5/1982 | Czuszak |
| 4,359,142 | A | 11/1982 | Schultz et al. |
| 4,361,774 | A | 11/1982 | Czech |
| 4,406,340 | A | 9/1983 | Gennaux |
| 4,448,552 | A | 5/1984 | White et al. |
| 4,545,332 | A | 10/1985 | Suzuki et al. |
| 4,575,311 | A | 3/1986 | Wood |
| 4,588,385 | A | 5/1986 | Suzuki et al. |
| 4,616,736 | A | 10/1986 | Fox |
| 4,683,771 | A | 8/1987 | Sogo et al. |
| 4,683,985 | A | 8/1987 | Hultgren |
| 4,684,838 | A | 8/1987 | Casanova |
| 4,700,808 | A | 10/1987 | Haentjens |
| 4,705,449 | A | 11/1987 | Christianson et al. |
| 4,741,303 | A | 5/1988 | Kronich |
| 4,762,471 | A | 8/1988 | Asanuma et al. |
| 4,763,031 | A | 8/1988 | Wang |
| 4,766,859 | A | 8/1988 | Miyaki et al. |
| 4,791,833 | A | 12/1988 | Sakai et al. |
| 4,803,897 | A | 2/1989 | Reed |
| 4,952,077 | A | 8/1990 | Kurt |
| 4,987,974 | A | 1/1991 | Crouch |
| 5,024,636 | A | 6/1991 | Phebus et al. |
| 5,161,644 | A | 11/1992 | Swenskowski et al. |
| 5,333,704 | A | 8/1994 | Hoff |
| 5,340,273 | A | 8/1994 | Rockwood |
| 5,453,181 | A | 9/1995 | Dahlback et al. |
| 5,478,290 | A | 12/1995 | Buuck et al. |
| 5,480,003 | A | 1/1996 | Hill et al. |
| 5,489,013 | A | 2/1996 | Buuck et al. |
| 5,505,112 | A | 4/1996 | Gee |
| 5,558,180 | A | 9/1996 | Yanagisawa |
| 5,591,018 | A | 1/1997 | Takeuchi et al. |
| 5,601,155 | A | 2/1997 | Gardner |
| 5,616,097 | A | 4/1997 | Dammon |
| 5,630,481 | A | 5/1997 | Rivard |
| 5,634,530 | A | 6/1997 | Maekawa et al. |
| 5,662,188 | A | 9/1997 | Ito et al. |
| 5,667,036 | A | 9/1997 | Mueller et al. |
| 5,699,877 | A | 12/1997 | Dreier |
| 5,725,072 | A | 3/1998 | Yamamoto et al. |
| 5,768,954 | A | 6/1998 | Grabherr et al. |
| 5,810,116 | A | 9/1998 | Kaptrosky |
| 5,860,403 | A | 1/1999 | Hirano et al. |
| 5,887,678 | A | 3/1999 | Lavender |
| 5,947,075 | A | 9/1999 | Ryu et al. |
| 6,057,617 | A * | 5/2000 | Schmid ............... 310/77 |
| 6,106,254 | A | 8/2000 | Hirooka et al. |
| 6,139,295 | A | 10/2000 | Utter et al. |
| 6,146,118 | A | 11/2000 | Haller et al. |
| 6,213,078 | B1 | 4/2001 | Ryu et al. |
| 6,213,081 | B1 | 4/2001 | Ryu et al. |
| 6,223,858 | B1 | 5/2001 | Ubagai et al. |
| 6,244,386 | B1 | 6/2001 | Takasaki et al. |
| 6,327,994 | B1 | 12/2001 | Labrador |
| 6,328,123 | B1 | 12/2001 | Niemann |
| 6,374,951 | B1 | 4/2002 | Michelhaugh |
| 6,394,061 | B2 | 5/2002 | Ryu et al. |
| 6,439,208 | B1 | 8/2002 | Jones |
| 6,488,110 | B2 | 12/2002 | Price |
| 6,516,789 | B1 | 2/2003 | Jones |
| 6,588,539 | B2 | 7/2003 | Hinton et al. |
| 6,616,432 | B2 | 9/2003 | Szczepanski et al. |
| 6,616,567 | B2 | 9/2003 | Strong et al. |
| 6,698,762 | B2 | 3/2004 | Newberg et al. |
| 6,705,555 | B1 | 3/2004 | Bratten |
| 6,810,849 | B1 | 11/2004 | Hirsch et al. |
| 6,852,061 | B2 | 2/2005 | Schoon |
| 6,863,043 | B2 | 3/2005 | Kurihara et al. |
| 6,964,313 | B2 | 11/2005 | Phillips, III et al. |
| 7,100,722 | B2 * | 9/2006 | Bowen ............... 180/65.51 |
| 7,243,749 | B2 | 7/2007 | Kakinami et al. |
| 7,455,616 | B2 | 11/2008 | Beltkowski |
| 7,622,836 | B2 | 11/2009 | DeVeny et al. |
| 2003/0032516 | A1 | 2/2003 | Gervais, III |
| 2003/0037737 | A1 | 2/2003 | Artola |
| 2004/0087405 | A1 | 5/2004 | Inoue et al. |
| 2004/0235606 | A1 | 11/2004 | Brossard |
| 2005/0032602 | A1 | 2/2005 | Wagle et al. |
| 2005/0176545 | A1 | 8/2005 | Miller et al. |
| 2005/0178893 | A1 | 8/2005 | Miller et al. |
| 2007/0123381 | A1 * | 5/2007 | Scharfenberg ............... 475/5 |
| 2007/0295557 | A1 | 12/2007 | Aldridge |
| 2008/0230284 | A1 | 9/2008 | Schoon |
| 2008/0230289 | A1 | 9/2008 | Schoon et al. |
| 2009/0078528 | A1 | 3/2009 | Uzawa et al. |

FOREIGN PATENT DOCUMENTS

| | | | |
|---|---|---|---|
| DE | 102004037266 A1 | | 4/2008 |
| EP | 1914154 A1 * | | 4/2008 |
| JP | 2008113489 A | | 5/2008 |
| JP | 60157593 A A | | 12/2008 |

OTHER PUBLICATIONS

U.S. Appl. No. 61/097,456, Schoon.
U.S. Appl. No. 61/073,021, Schoon.
General Electric EV-1 B,C,D Manual.
Imperial Electric Offset Gearbox Frame 56.
Schoon, PCT/US2008/056337, International Search Report, Jun. 9, 2009, PCT.
Schoon, PCT/US2008/056337, Written Opinion of the International Searching Authority, Jun. 9, 2009, PCT.
Inventor: Schoon, U.S. Appl. No. 12/629,204, filed Dec. 2, 2009; Entitled:Integrated Spindle-Carrier Electric Wheel Drive; 8602.
European Search Report, EP 1 843 056 A3, Application No. EP 06 01 9821, Dec. 12, 2008, Munich, 8307.
U.S. Appl. No. 61/097,456, filed Sep. 16, 2008, Schoon.
U.S. Appl. No. 61/073,021, filed Jun. 16, 2008, Schoon.
European Patent Office, European Extended Search Report, Application No. EP09162582 Filed Jun. 12, 2009, Entitled Gear Reducer Electric Motor Assembly With Internal Brake, Jun. 17, 2011, Applicant Fairfield Manufacturing Company, Inc., Inventors Schoon et al.
Canadian Patent Office, Office Action Dated Dec. 9, 2010, Application No. 2667748 Filed May 29, 2009, Entitled Gear Reducer Electric Motor Assembly With Internal Brake, Applicant Fairfield Manufacturing Company, Inc., Inventors Schoon et al.
Chinese Patent Office, Office Action Dated Aug. 5, 2011, Application No. 200910145971.4 Filed Jun. 15, 2009, Entitled Gear Reducer Electric Motor Assembly With Internal Brake, Applicant Fairfield Manufacturing Company, Inc., Inventors Schoon et al.
Chinese Patent Office, Office Action Dated Feb. 1, 2011, Application No. 200910145971.4 Filed Jun. 15, 2009, Entitled Gear Reducer Electric Motor Assembly With Internal Brake, Applicant Fairfield Manufacturing Company, Inc., Inventors Schoon et al.
Fairfield Manufacturing Company, Inc., Ratings and Performance Guide, Torque-Hub Planetary Final Drives, Jun. 1998, Lafayette, Indiana.
Fairfield Manufacturing Company, Inc. Product Selection Guide, Torque-Hub Planetary Final Drives, at Least as early as Dec. 15, 2011, Lafayette, Indiana.
Fairfield Manufacturing Company, Inc. Manufacturing Capabilities Guide, Custom Gears & Gear Assemblies, Copyright 2001, Lafayette, Indiana.
Fairfield Manufacturing Company, Inc, Product Guide CT & CW Series, Copyright 2001, Lafayette, Indiana.
Fairfield Manufacturing Company, Inc, Fairfield Geared for Excellence, Copyright 2001, Lafayette, Indiana.

* cited by examiner

GEAR REDUCER ELECTRIC MOTOR ASSEMBLY WITH INTERNAL BRAKE

This patent application claims priority to provisional patent application Ser. No. 61/073,021 filed Jun. 16, 2008 and to provisional patent applications Ser. No. 61/097,456 filed Sep. 16, 2008.

FIELD OF THE INVENTION

The invention is in the field of torque hubs used to supply power and torque to drive wheels of vehicles.

BACKGROUND OF THE INVENTION

Small boom lifts, for example those less than 15,000 lbs. gross vehicle weight, are generally two wheel drive battery powered machines for indoor use only. The wheels on these machines are primarily driven with electric motors and planetary gearboxes on the non steering axle of the machine. The configuration of this electric drive system is extremely long and makes it impossible to drive the steering wheels because the electric motor extends too far and interferes with the operation of the vehicle by engaging the frame of the vehicle. In addition, because these electric motors are normally in the non-steer axle on an indoor machine, they do not have (or need) any sort of environmental protection.

The major hurdle for putting a hybrid electric system in a large gross vehicle weight machine, prior to the invention described and claimed herein, is that the same type of electric drive assembly used on small boom lifts cannot be used in large boom lifts. Therefore, there is a need for an electric drive assembly that has a higher power density and is environmentally protected. The instant invention solves the problem and answers the need.

SUMMARY OF THE INVENTION

The invention is an electric wheel drive assembly which includes a high speed electric motor, an internal brake and a three stage gear reducer. It can be used on aerial work platforms (boom lifts, large scissors lifts), tele-handlers, large fork lifts, agricultural vehicles and the like. The drive is powered with three phase electrical power to an induction AC motor. The front end of the motor shaft is supported by a bearing contained within an electromagnetic brake which is spring applied, electromagnetic release. The brake includes a friction disc which is connected (splined) to the motor shaft and provides parking and emergency braking. The motor shaft connects to the sun gear of a triple planetary gearbox with a gear reduction range of 90:1 to 160:1. The first two planetary stages are nested within the diameter of the main wheel support bearings. The output planetary stage resides toward the cover end and outputs to the ring gear which drives the wheel hub. The cover contains a cap secured with two screws that can be removed and then the cap may be flipped acting on rods 113 and 109 to disengage the assembly from the motor and brake. A rod pushes into the assembly against the force of a spring and disconnects a splined connection.

The invention provides advantages in the market in that an electric wheel drive may be used for a heavier machine. By way of example a boom lift type machine is described. However, the invention is not limited to this machine. Large boom lifts greater than 15,000 lbs. gross vehicle weight are generally suited for outdoor work and they can be two wheel drive or four wheel drive. Wheels on these machines are generally driven with hydraulic motors and planetary gearboxes. Hydraulic systems required to propel the wheels present a problem because the hydraulic system is typically driven by an internal combustion engine sized for the peak power and torque required out of the machine. Boom machines are very rarely operated at their peak power, for example, when climbing a steep grade (usually during loading on a trailer). Regardless of the output power required at the wheels or other systems, the hydraulic system constantly demands peak power out of the internal combustion engine, making it a very inefficient machine. With increasingly stringent emissions standards, consumers are considering a conversion of their boom lifts to machines employing hybrid electric systems.

A compact gear reducer electric motor assembly with an internal brake is disclosed and claimed wherein a high speed electric motor is interconnected with a gear reducer having substantial gear reduction. High power density is created by employing a high speed AC motor with a maximum speed of 6000 rotations per minute with a very compact high reduction gear box with a brake nested substantially within the windings of the motor. The assembly includes a spindle and a brake mounted substantially within the high speed electric motor. The brake is operable against a spring biasing said brake into engagement with a friction plate. The brake is electrically actuated which disengages the pressure plate from the friction plate or disc to permit rotation of the motor shaft and transmission of energy to the gear reducer.

The gear reducer includes input, intermediate and output planetary stages. The input and intermediate stages reside within the spindle and the output planetary stage drives an output ring gear. Releasing means for releasing the output ring gear from the brake allow rotation thereof such that the machine may be moved or towed.

The invention includes packaging the high speed planetary stages, for example the input and intermediate stages, within the main support bearings. Traditionally, the high speed gearing in a planetary wheel drive gearbox is towards the cover end. By housing the high speed stages within the bearings, three planetary stages are supported in a shorter axial length.

The invention, in one example, "nests" or houses the brake within the winding end turns of the electric motor. AC induction motors have long winding end turns that normally just occupy space. The invention utilizes this space as a place for the brake housing thus reducing the axial length of the motor-brake-gear reducer by approximately 1 inch.

The brake provides bearing support for the end of the motor shaft. A bearing is interposed between the motor shaft and the brake. The compact gear reducer electric motor assembly includes a high speed electric motor interconnected with a gear reducer having a gear reduction in the range of 1:90 to 1:160. The gear reducer includes a spindle and a disconnect shaft. The disconnect shaft transmits energy of the high speed electric motor to the gear reducer. An internal brake includes a housing and springs mounted therein and an electromagnetic coil therein.

The internal brake includes a friction plate affixed to the spindle. The internal brake further includes a housing and first and second pressure plates. The first and second pressure plates each include a passageway therethrough. A spacer resides between the first and second plates. The friction plate is affixed to the motor shaft and is rotatable therewith. The friction plate is generally disk-shaped having first and second sides and includes frictional material affixed thereto on the first and second sides thereof.

The springs of the brake are operable between the housing of the brake and the first pressure plate. The pressure plates are ferromagnetic and attractable by the coil of the brake when the coil is energized. The spring urges the first pressure plate into engagement with the friction plate when the coil is de-energized. The internal brake is substantially within the high speed electric motor.

The brake is electrically actuated to permit transmission of energy to the gear reducer. The gear reducer includes input, intermediate and output planetary stages. The input and intermediate stages reside within the spindle. The output planetary stage drives an output ring gear. The electric motor includes a shaft and the electric motor includes electric windings radially spaced from the shaft creating a void or space between the shaft and windings. The electric brake resides substantially within the space between the shaft and the windings. The input planetary stage includes an input planet sun gear and planet gears. The planet gears of the input stage have a first width and the intermediate planetary stage includes an intermediate sun gear and intermediate planet gears. The intermediate planet gears have a second width. The first width of the input stage gears is less than one-half the width of the intermediate planet gears having a second width.

Other examples employ different orientation of the brake assembly and different configurations of the planetary gear stages.

It is an object of the invention to provide a torque hub having a high speed electric motor, internal brake, and a gear reducer in a small volume.

It is a further object of the invention to provide a torque hub having a high speed electric motor which through a gearing reduction provides large torque for movement of the vehicle against a heavy load.

It is a further object of the invention to provide a torque hub which is relatively short as compared to a hydraulically driven motor enabling the vehicle to turn.

It is a further object of the invention to provide a torque hub which includes a brake substantially residing within an electric motor.

It is a further object of the invention to provide a torque hub which is short and compact.

It is a further object of the invention to provide a torque hub utilizing a gearbox wherein first and second stages thereof reside within the spindle and the third stage resides within an outer ring gear providing a quiet gear box with large speed reduction.

It is a further object of the invention to provide a torque hub which is short and compact and which employs sun planet gears which are less than one-half the width of the intermediate planet gears.

DESCRIPTION OF THE INVENTION

Figure 1:
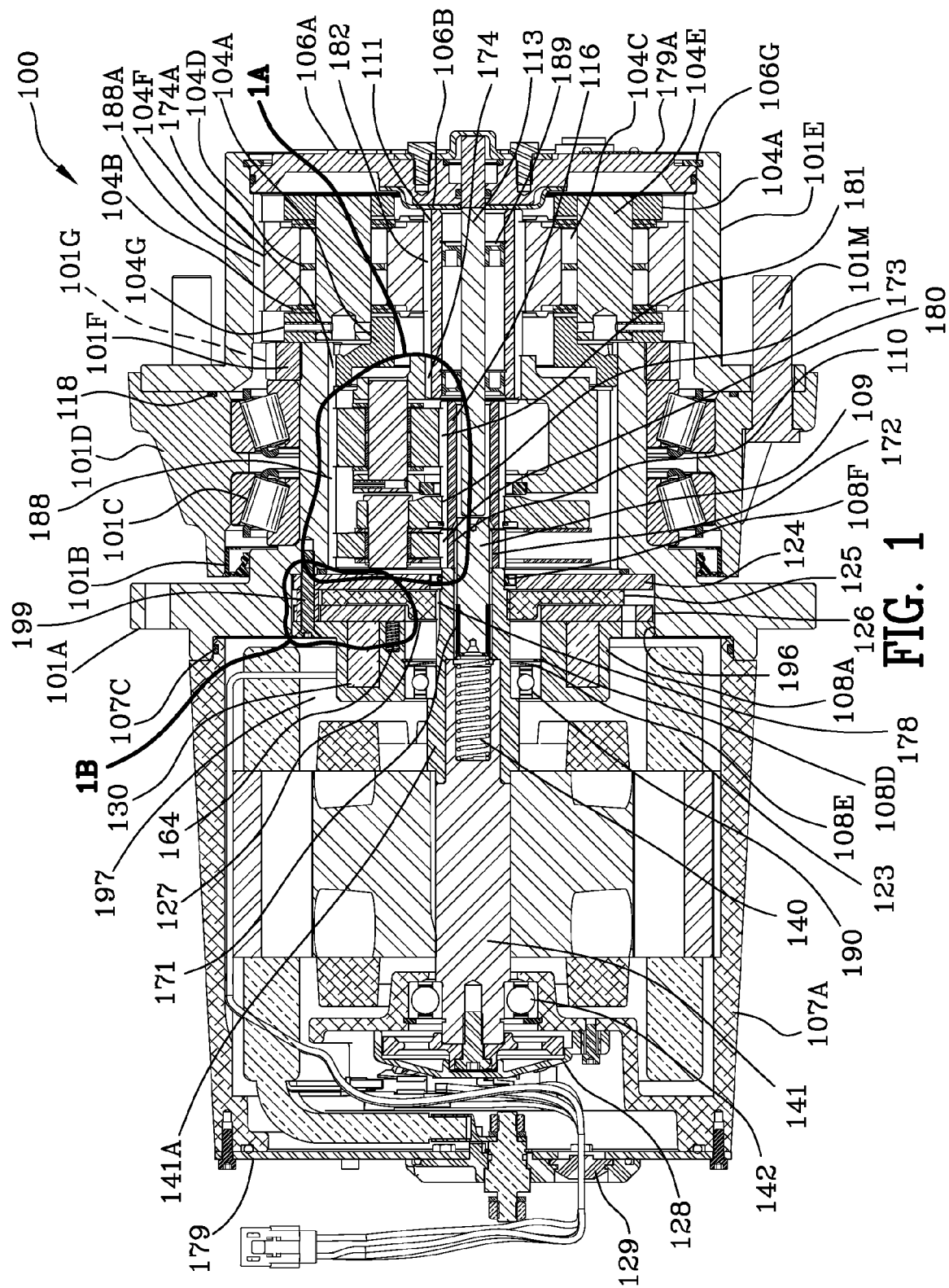
FIG. 1 is a cross-sectional assembly view of the preferred example of the motor-brake-gear reducer with the brake housing residing substantially within the electric motor.

FIG. 1 is a cross-sectional assembly view 100 of the preferred example of the motor-brake-gear reducer with the brake housing residing substantially within the electric motor. Referring to FIG. 1, reference numeral 101A is a steel spindle/input ring gear which houses the planetary gear stages. Lip seal 101B seals the gap between the spindle/input ring gear and the wheel hub 101D. Main bearings 101C support the wheel hub 101D and output ring gear 101E for rotation relative to the spindle 101A. Bearing nut 101F and set screw 101G secure the bearings 101C in place longitudinally. Internal gears and gearbox components are made of steel or stainless steel. Spindle 101A is steel or a steel alloy.

Figure 1A:
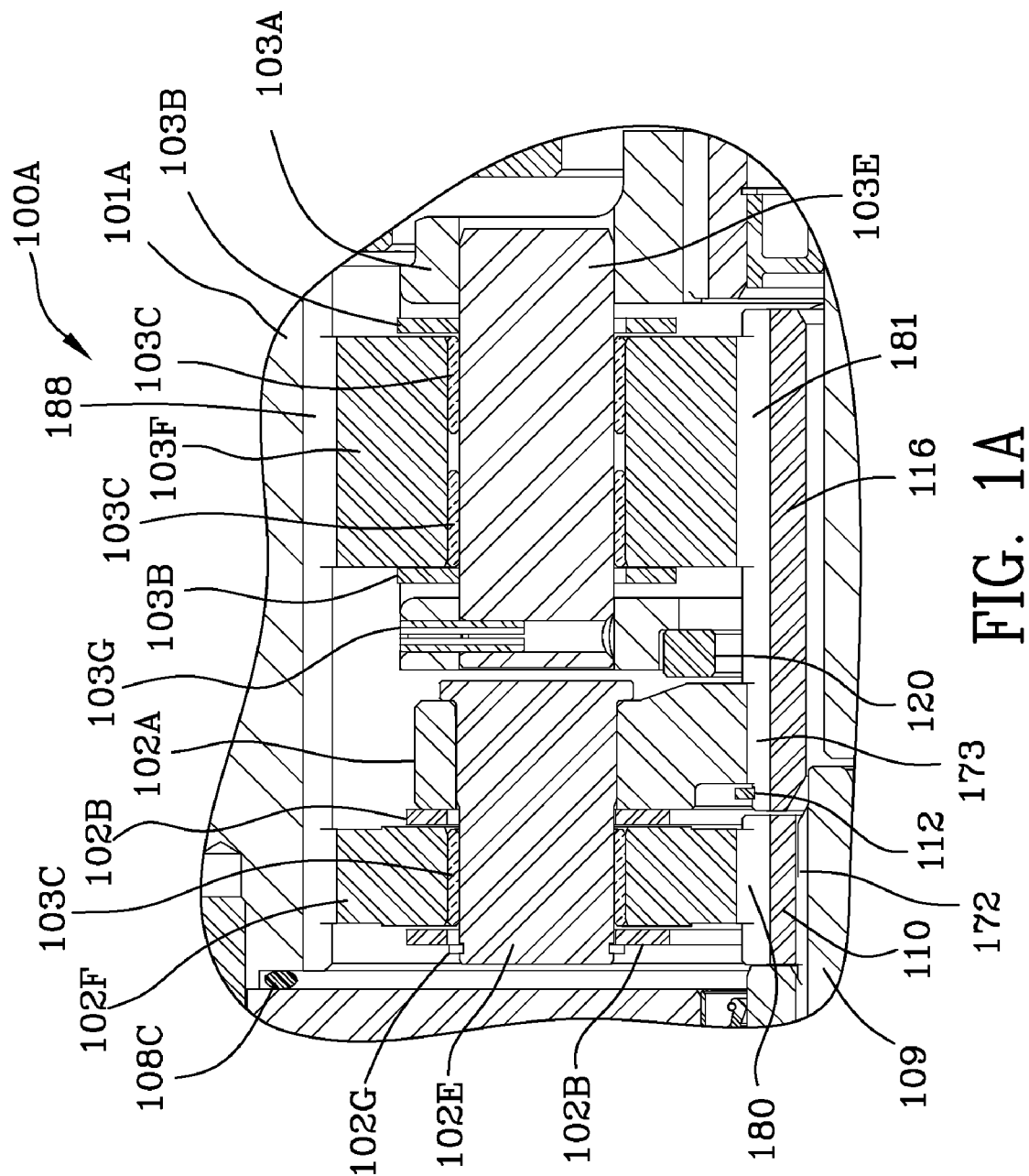
FIG. 1A is an enlargement of a portion of FIG. 1 illustrating the input planet gears and intermediate planet gears.

FIG. 1A is an enlargement 100A of a portion of FIG. 1 illustrating the input planet gears 102F and intermediate planet gears 103F. Input carrier 102A along with thrust plates 102B are illustrated in FIG. 1A. Input planet pins 102E secure input planet gears 102F to the input planet carrier 102A. The input planet gears 102F are secured by the input planet pin retaining rings 102G. Input planet gears 102F are driven 180 by input sun gear 110 which is driven by splined 172 disconnect shaft 109. Retaining ring 112 retains the intermediate sun gear 116 and the input planet carrier 102A.

Still referring to FIG. 1A, input planet gears 102F include 35 carburized teeth and are driven by carburized input sun gear 110 having 19 teeth. Input thrust plates 102B secure input planet gears 102F to the input planet pins 102E. Input/intermediate planet bushings 103C support input planet gears 102F and intermediate planet gears 103F. Input planet pin retaining rings 102G secure thrust plates 102B in place to retain input planet pins 102E. Input sun gear 110 is trapped against longitudinal movement by motor shaft 141 and intermediate sun gear 116. Similarly input thrust washers 103B secure intermediate planet gears 103F to the intermediate planet pins 103E. Input carrier 102A is driven by input planet pins 102E and is splined 173 to intermediate sun gear 116. Intermediate sun gear 116 includes 19 carburized teeth and drives 180 intermediate planet gears 103F which interengage and react against teeth of internal ring gear 188 of spindle 101A.

Intermediate sun retaining ring 112 retains input carrier 102A. Thrust spacer 120 resides between input carrier 102A and intermediate carrier 103A. Intermediate carrier roll pin 103G secures the intermediate carrier 103A to the intermediate pin 103E. The intermediate carrier 103A serves to maintain and secure the thrust washers 103B in place. A shoulder (unnumbered) on output sun gear 111 secures the intermediate carrier 103A in place and hence the intermediate gears in place as well. See FIG. 1. Output carrier 104A is splined 174A to the internal ring gear 188 of the spindle 101A and is stationary (fixed or is grounded). It should be noted that the input planet gears, the input carrier, the intermediate planet gears and the intermediate carrier are permitted to move longitudinally a small distance limited by retaining rings, thrust spacers and the other structure of the elements in proximity thereto.

Figure 1B:
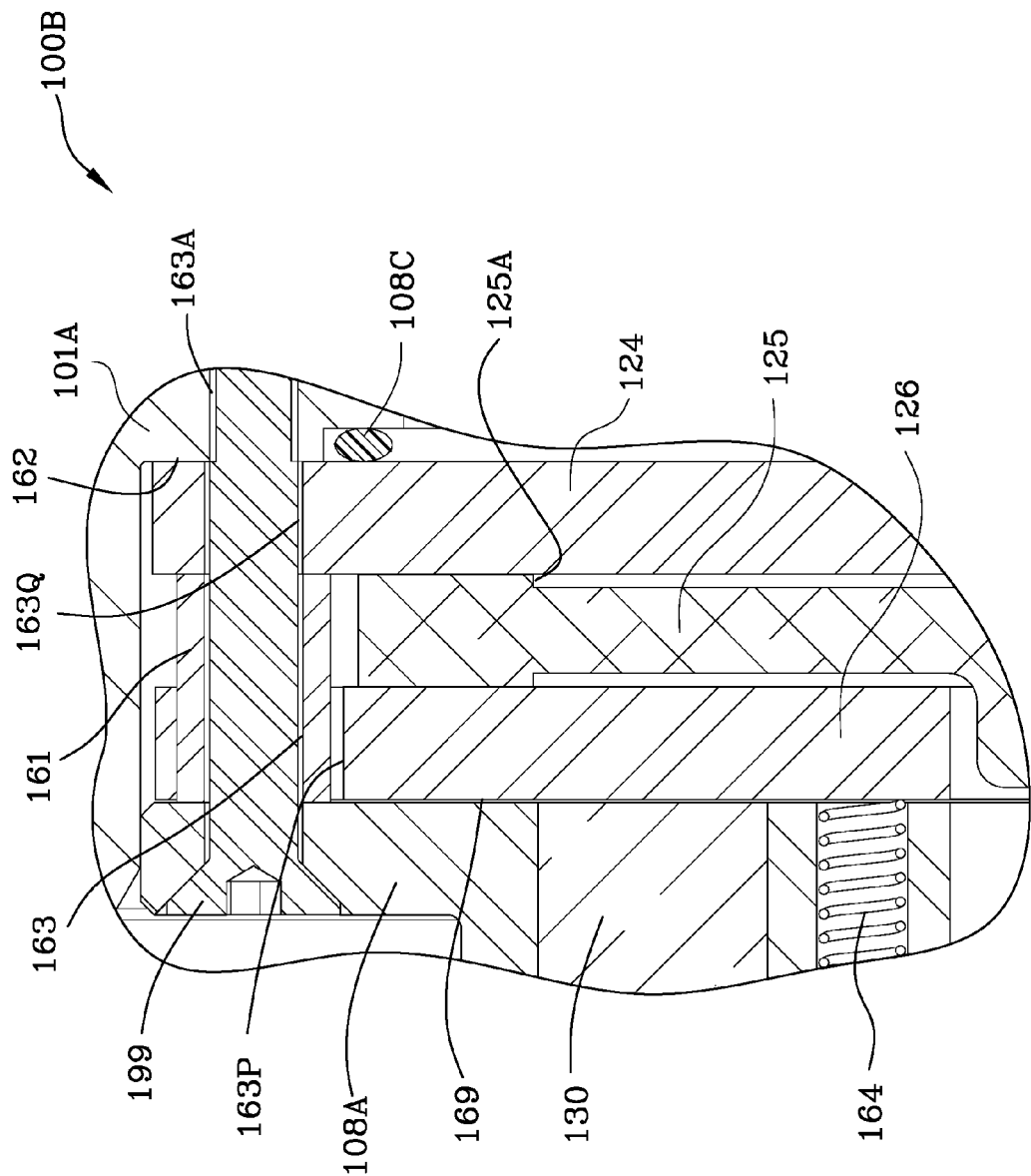
FIG. 1B is an enlargement of a portion of FIG. 1 illustrating a portion of the brake.

FIG. 1B is an enlargement of a portion of FIG. 1 illustrating a portion 100B of the brake 108A. Inertia Dynamics Incorporated (hereinafter "IDI") manufactures the spring applied-coil energized to release brake described herein. The IDI brake is adapted to be mounted to the spindle 101A of the gear reducer in a direction opposite to the normal orientation so as to economically use the space 197 available within the spindle and the electric motor. The normal orientation of the brake can be viewed in FIGS. 2-4. Energized coil 130 in brake 108A attracts ferromagnetic actuating plate 126 (sometimes referred to as the clapper) against the force of springs 164 and away from friction plate 125 to permit friction plate 125 to rotate with motor shaft 141/141A. See FIG. 1. When coil 130 is actuated, plate 126 abuts body 108A of the housing and gap 169 illustrated in FIG. 1B is eliminated. Coil 130 is a direct current coil operable at 80 Volts direct current, 27 Watts.

Friction plate 125 includes friction material 125A affixed thereto. Adhesive is used to affix the friction material to the friction plate. The friction material is located near the circumferential extent of the friction plate 125. When the brake is applied, springs 164 urge the actuating plate 126 against the friction plate 125 and, in particular, against the friction material 125A affixed to the friction plate 125. As illustrated in FIG. 1B, the friction material 125A is illustrated against and in engagement with plates 126 and 124. Plate 124 is shown pinned 162 to the spindles 101A as the spacer or standoff 161 is trapped between the body 108A of the brake and the pressure plate 124. Spacer or standoff 161 includes a passageway 163 therethrough for bolt 199. Similarly, plate 126 includes a passageway 163P for the spacer to reside. Pressure plate 124 includes a passageway 163Q for bolt 199 to reside. Bolts 199 secure the housing 108A to the spindle 101A and prevent rotation of the plates 124, 126. Bolt 199, housing 108A and spacer 161 secure plate 124 against and into engagement with spindle 101A. Bolt 199 is illustrated forcing body 108A against the spacer 161 which in turn forces the spacer against the pressure plate 124 which in turn forces the pressure plate 124 against the spindle 101A. There are three bolts 199 and numerous springs 164 used in the assembly. Brake 108A is sealed 108C against the spindle 101A.

Figure 1C:
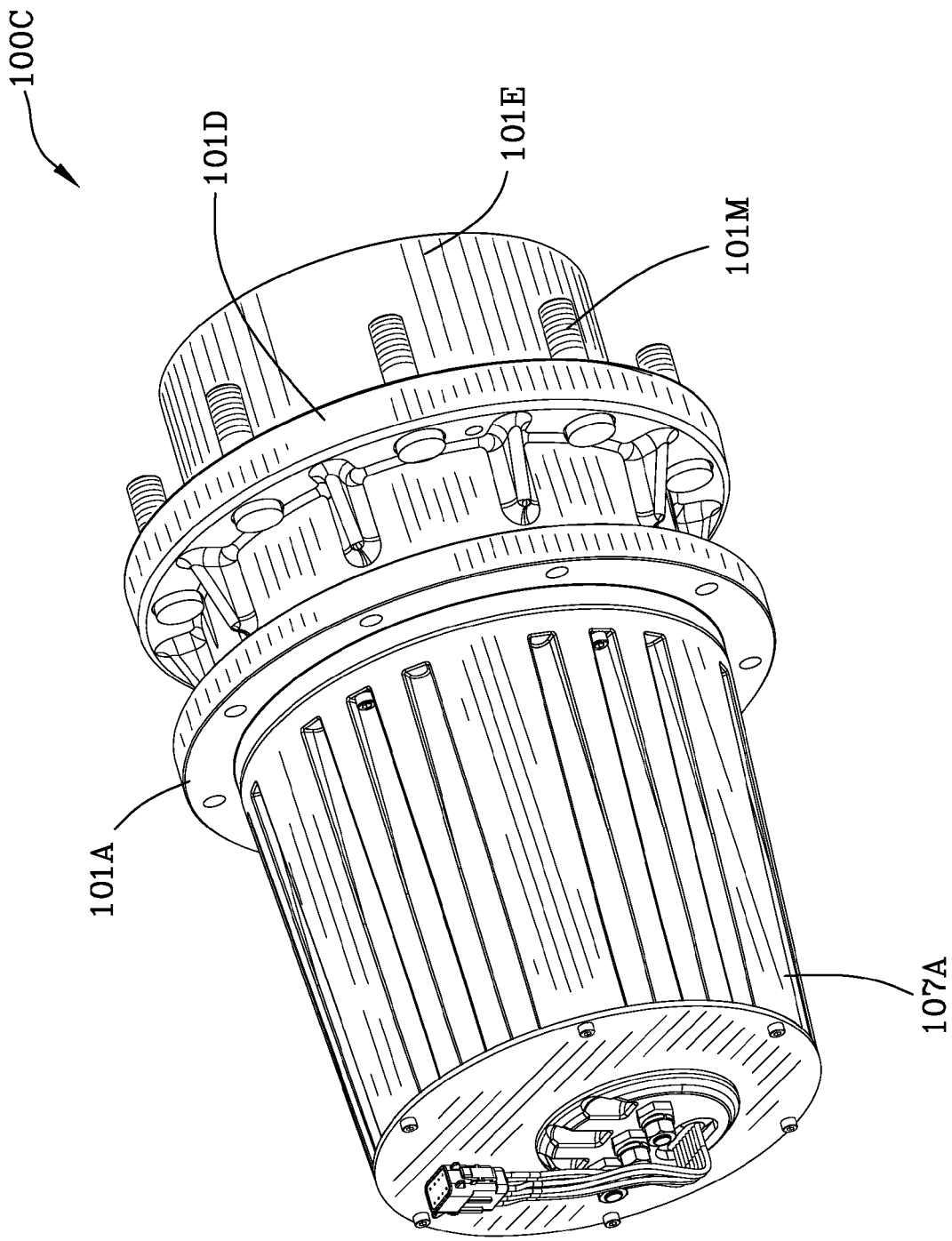
FIG. 1C is a perspective view of the assembly of the preferred example of the motor-brake-gear reducer.

FIG. 1C is a perspective view 100C of the assembly of the preferred example of the motor-brake-gear reducer illustrating the exterior of the motor 107A (Advanced 72V alternating current motor, IP67 protection rating), spindle 101A, the hub 101D, and the exterior of the output ring gear 101E. Motor 107A is an Advanced 72 Volt alternating current motor carrying an IP 67 protection rating. IP stands for ingress protection and "6" is the highest rating for protection of dust infiltration and "7" is a rating for water infiltration when the enclosure is submersed 15 cm to 1 meter for 30 minutes.

Referring to FIGS. 1 and 1C, motor 107A has a generally cylindrically shaped tapered exterior. Motor shaft 141/141A is an interference fit. Spring 140 bears upon disconnect shaft 109. Towing of the machine is accomplished by reversing the orientation of the unnumbered cap which involves removal of the unnumbered screws. Once the orientation of the cap is reversed and is bolted in place, it forces an unnumbered rod leftwardly which forces rods 113 and 109 leftwardly. Once the disconnect cap is removed, the orientation of the cap is reversed such that the button portion of the cap is reversed (oriented leftwardly) pushing an unnumbered rod which acts upon disconnect rod 113 and disconnect shaft 109 moving them leftwardly causing disengagement of shaft 109 from the sun gear 110. The bolts (unnumbered) are used to hold the button onto the cover 106A. The reversely oriented button thus disconnects the motor from the gearbox putting it in the tow mode. Bushings 189 support internal disconnect rod 113.

Motor shaft 141/141A is supported by bearings 142 at the generally leftward end of the motor and is supported by bearings 190 at the generally rightward end of the motor. Bearings reside between stationary brake 108A and shaft 141A. Brake 108A is bolted with bolts 199 to spindle 101A. Motor 107A is sealed 107C with O-rings to prevent the intrusion of water or dust at the joint of the spindle and motor. Motor 107A is affixed to spindle 101A with bolts which are unnumbered in FIG. 1C. Motor 107A is sealed such that the wires which supply power to the motor and the coil as well as wires which communicate with sensor 128 pass through the motor enclosure such that they are sealed from the intrusion of dust and water.

Brake 108A is mounted in a direction such that the coil 130 protrudes into a cavity or volume 197 between the motor's windings 123 and the shaft of the motor 141/141A. Brake 108A resides in the diametrical bore 196 of one end of the spindle 101A. Bearings 190 are tensioned and retained in place by spring 108E operable between ring 108D residing in a groove in an inner diametrical bore of the brake and the bearing 190. Spring 108E urges bearing 190 against a shoulder on the exterior of the shaft 141A. Spindle 101A forms intermediate ring gear 188.

Referring to FIG. 1A, input sun gear 110 is carburized and has 19 teeth. Input sun gear 110 is splined 172 to the disconnect shaft 109. Input carrier 102A is splined 173 to the intermediate sun 116 which in turn drives intermediate planet gears 103F. Intermediate sun 116 and intermediate planet gears 103F intermesh 181 with each other. It will be noticed that FIGS. 1 and 1A depict input planet gears 102F which are less than one-half as wide as the intermediate planet gears 103F which results in positioning the first and second planetary stages within ring gear 188 within the spindle 101A thus saving axial space within the gearbox while effectively and efficiently transmitting power and torque.

Referring to FIGS. 1 and 1A, input seal 108F and brake O-ring 108C seal the gearbox from the motor preventing unwanted lubricating oil in the motor. Hub 101D is affixed to output ring gear 101E with bolts 101M. Main lip seal 101B seals between the output ring gear 101E, hub 101D, and the spindle/input ring gear 101A. Main bearings 101C interengaging wheel hub 101D and spindle 101A enabling rotation of the wheel hub 101D with respect to the spindle 101A which is affixed to the vehicle and is not rotatable. Bearing nut 101F and set screws 101G ensure that bearings 101C are secured against the spindle 101A. Seals such as elastomeric O-ring seals 118 are used in the gearbox where necessary.

Still referring to FIGS. 1 and 1A, intermediate gears 103F drive intermediate carrier 103A which is splined 174 to output sun gear 111. The intermediate stage planet gears have 35 teeth. Carburized output sun gear 111 includes 25 teeth and drives 182 output planet gears 104F which interengage teeth 188A of the output ring gear 101E. There are four output planet gears; however, different numbers of output planet gears may be used such as 3 or 5. Output carrier 104A positions the output planet gears 104F and output planet pins 104E apart from the first (input stage) and the second (intermediate stage) and within the output ring gear 101E. The number of teeth employed by the input planet gears, intermediate planet gears, and output planet gears are by way of example only as the invention includes the flexibility to employ different ratios by changing tooth combinations in the input and intermediate stages.

Still referring to FIGS. 1 and 1A, the output planet carrier 104A is stationary. Spline 174A of the output planet carrier is interconnected with the internal ring gear 188 of the spindle. Therefore, the output carrier 104A is stationary. Output planet pins 104E are fixed within the output planet carrier 104A. Output planet gears 104F rotate about stationary output planet pins 104E and intermesh 188A with the output internal ring gear causing it to rotate and drive a wheel (not shown) affixed by studs 101M and nuts (not shown). Output planet thrust washers 104B abut the output carrier 104A and prevent side to side movement of the output planet gears 104F. Output planet needle rollers 104C are separated by an output planet spacer 104D and enable rotation of the output gears 104F with respect to output planet pins 104E. Output planet roll pins 104G secure the output planet pins 104E to the output planet carrier 104A.

A double walled intermediate carrier 103A is splined to the output sun gear 111. Intermediate planet thrust washers 103B secure the intermediate planet gears 103F longitudinally and bushings 103C are interposed between the input planet gears and the input planet pins 102E. Bushings 103C are interposed between the intermediate planet gears 103F and the intermediate planet pins 103E. Intermediate carrier roll pin 103G secures the intermediate carrier 103A to the intermediate planet pins to be driven by the planet gears. A thrust spacer 120 is located between the input and intermediate carriers. See FIG. 1A.

Still referring to FIGS. 1 and 1A, planet output carrier 104A is secured with pins 104G to the planet output pins 104E. Output planet thrust washers 104B secures the output planet gears 104F against longitudinal movement. Output planet spacer 104D separates the output planet needle roller bearings which are interposed between the interior of the output planet gears 104F and the output pins 104E to enable rotation of the output gears with respect to the output pins. Cover assembly 106A is retained by the cover retaining ring 106G. Cover thrust washer 106B interengages output sun gear 111 driven by the intermediate carrier 103A.

An Advanced 72V AC electric motor 107A has an IP67 Protection Rating (waterproof to 1 meter) and drives splined disconnect shaft 109 which in turn drives the input sun gear 110 which in turn drives the input planet gears 102F. The motor housing 107A is, of course, affixed to the spindle 101A as illustrated in FIG. 1C.

Still referring to FIG. 1, an O-ring seal 107C is interposed between the motor housing 107A and spindle 101A. An electric brake 108A is affixed to the spindle 101A with brake mounting bolts 199 and a seal 108C resides between the brake and the spindle 101A. The brake assembly includes a pressure plate 124, a stationary plate 126, and a friction plate 125. Friction plate 125 is affixed to (splined 178) the motor shaft 141/141A and rotates with the electric motor shaft 141/141A. When the coil 130 in the housing 108A is energized, the pressure plate 124 is pulled away from and disengages the friction plate 125 thus negating the brake. Springs 164 force the pressure plate 126 into engagement with the friction plate 125 which prohibits rotation of shaft 141/141A. Bearing preload spring 108E acts upon snap ring 108D which resides in a recess in the inner bore of the brake 108A. Motor sensor 128 is illustrated for use in connection with the speed control of the motor. A water seal 129 for the electrical wires (unnumbered) is also illustrated. The brake housing 108A is mounted within the coil windings 123 of the electric motor. In this way space is saved and the overall length of the motor-gearbox-assembly is minimized.

The input planet gears 102F are not as wide as the intermediate planet gears 103F. The gear arrangement set forth in the preferred example as set forth in FIGS. 1, 1A and 1B is superior to other arrangements because it is short in length, has high reduction, and is relatively impervious to dust and water.

The machine described herein includes a hybrid system containing a generator set for charging a bank of batteries. The batteries power all the machine functions including the wheel drive assemblies. When the battery reaches a certain discharge stage, the generator set will turn on and charge the batteries. This inherently smooths out the peaks and valleys of the power draw. As a result, the engine is only producing the power that the machine needs resulting in a considerably more efficient system with less emissions and quieter operation.

The invention is short enough in axial length as depicted in FIG. 1 that it can be put onto a steer wheel of a vehicle without protruding too far outside the vehicle undercarriage and without protruding too far inside the vehicle undercarriage. The power density of the invention is a result of using a high speed AC motor (6000 RPM max) with a very compact high reduction gearbox and brake. High speed motors are much more compact than low speed motors for a given horsepower. The assembly is also capable of operating in an outdoor environment. The motor gearbox assembly has been designed for IP67 rating (submersible up to 1 m of water).

The invention includes the following features. The compact arrangement of a high speed motor, high reduction gearbox, and electromagnetic brake minimize the utilization of space. Below are some additional features of this invention.

Packaging the high speed (1st and 2nd stages) planetary stages within the main wheel support bearings saves space. Traditionally the high speed gearing in a planetary wheel drive gearbox is toward the cover end. By moving the high speed stages within the bearings, the three planetary stages, input 102F, intermediate 103F and output fit 104F in a shorter axial length than a traditional two planetary stage assembly. In addition, with the high speed gearing away from the cover, the noise transmission to the outside environment is reduced considerably.

The invention as set forth in FIGS. 1, 1A, 1B and 1C includes nesting the brake within the winding end turns 123 of the motor 107A which saves space. Induction AC motors traditionally have long winding end turns that normally just occupy space. The first example utilizes this axial length by nesting the brake housing 108A within the end turns. This results in about a 1" reduction in axial length.

Using the brake 108A as a motor support piece saves space. The brake provides bearing support for the motor shaft 141/141A as well as seals the motor from gearbox assembly (which contains oil).

Exiting the leads 129 in a sealed fashion allows use in wet environments. Power (high current) leads and low current leads that communicate power and control signals outside the motor exit the motor enclosure without breaking a seal. The low current wires exit through an overmolded grommet.

In the event of a power loss the brake 108A will engage. If the machine needs to be towed, it is not necessary for the operator to remove the motor to access and release the brake mechanically. The disconnect 113/109 allows release from the brake with relative ease. Disconnect rod 113 is pushed inwardly/leftwardly when viewing FIG. 1 which in turn pushes disconnect spline 109 against the force of spring 140 which releases the splined interconnection between disconnect 109 and the input sun gear which enables the wheel hub to turn freely thus moving the vehicle.

Figure 2:
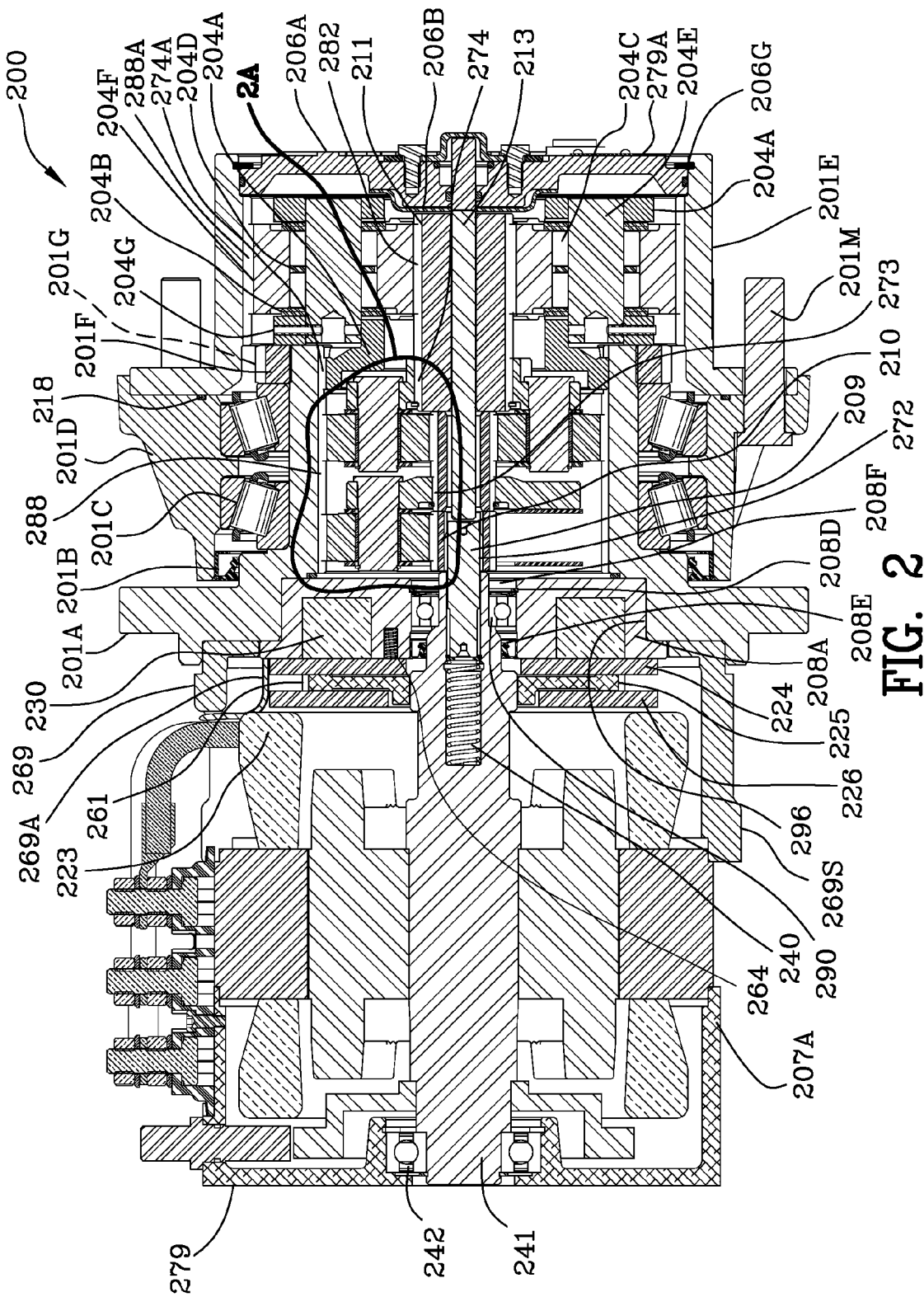
FIG. 2 is a cross-sectional assembly view of another example of the motor-brake-gear reducer.

FIG. 2 is a cross-sectional assembly view 200 of another example of the motor-brake-gear reducer. Referring to the examples set forth in drawing FIG. 2, an internal brake is mounted such that the coils 230 in the housing 208A of the brake which attracts the plate 224 are located in proximity to the spindle 201A. In the preferred example of FIGS. 1, 1A and 1B, the internal brake is mounted such that the coil 230 is mounted substantially within the electric motor thus saving space.

Figure 2A:
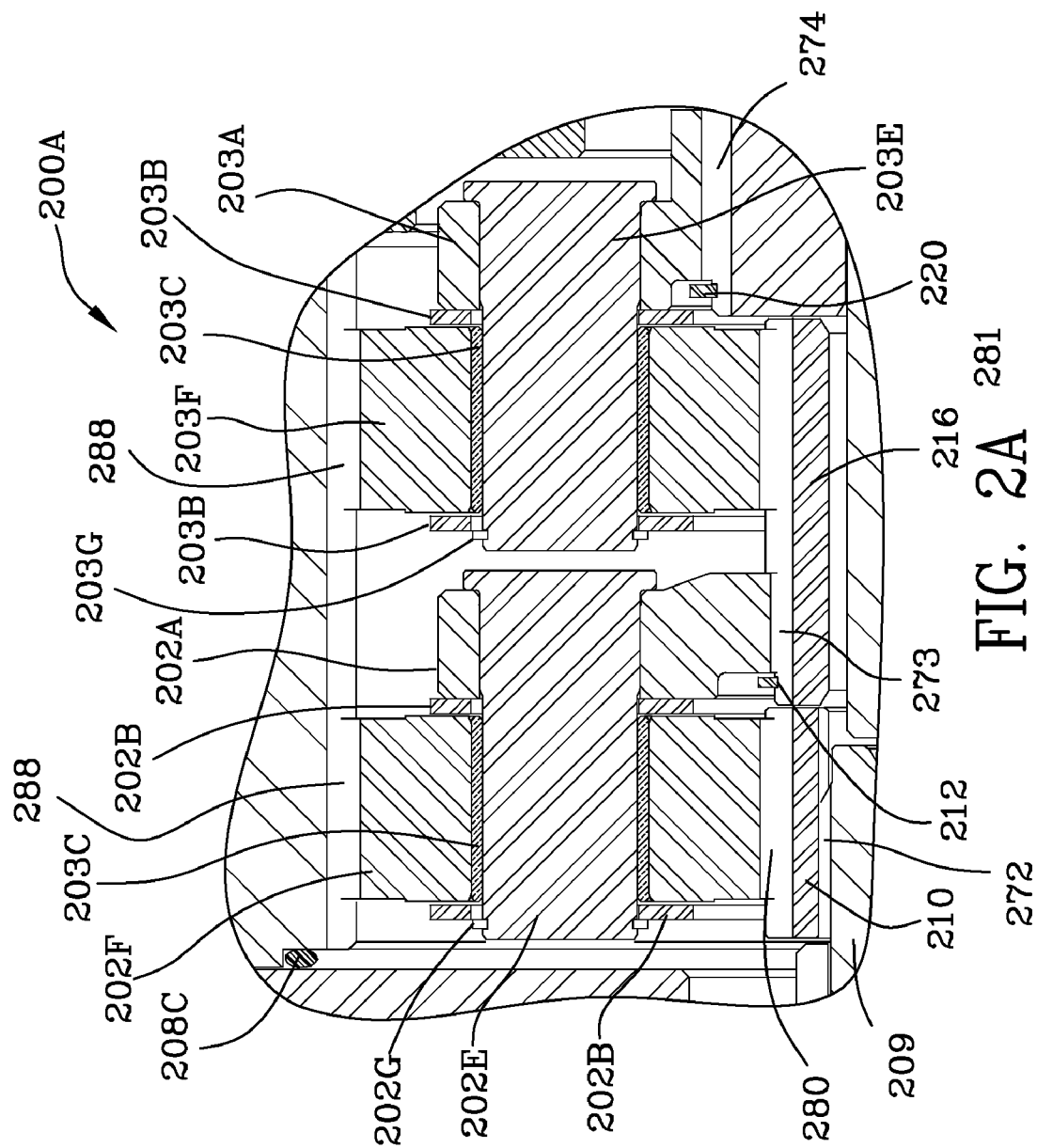
FIG. 2A is an enlargement of a portion of FIG. 2 illustrating the input planet gears and intermediate planet gears.

FIG. 2A is an enlargement 200A of a portion of FIG. 2 illustrating the input planet gears 202F and intermediate planet gears 203F. In the example set forth in FIGS. 2 and 2A it will be noticed that input planet gears 202F are the same width as the intermediate planet gears 203F.

Lip seal 201B seals the gap between the spindle/input ring gear and the wheel hub 101D. Main bearings 201C support the wheel hub 201D and output ring gear 201E for rotation relative to the spindle 201A. Bearing nut 201F and set screw 201G secure the bearings 201C in place longitudinally.

FIG. 2A is an enlargement 200A of a portion of FIG. 2 illustrating the input planet gears 202F and intermediate planet gears 203F. Input carrier 202A along with thrust plates 202B are illustrated in FIG. 2. Input planet pins 202E secure input planet gears 202F to the input planet carrier 202A. The input planet gears 202F are secured to the input planet pin 202E by plates 202B. Bushings 203C reside between the input planet gears and the pins 202E. The input sun gear 210 is driven by splined 272 disconnect shaft 209. Teeth of the input sun gear 210 intermesh 280 with teeth of the input planet gears 202F driving the input planet gears. Retaining ring 212 retains the intermediate sun gear 216.

Still referring to FIG. 2A, input planet gears 202F include 35 carburized teeth and are driven by carburized input sun gear 210 having 19 teeth. Input thrust plates 202B secure input planet gears 202F to the input planet pins 202E. Input/intermediate planet bushings 203C support input planet gears 202F and intermediate planet gears 203F. Input planet pin retaining rings 202G secure thrust plates 202B to input planet pins 202E. Similarly input thrust plates 203B secure intermediate planet gears 203F to the intermediate planet pins 203E. Input carrier 202A is driven by input planet pins 202E and the input carrier is splined 273 to intermediate sun gear 216. Intermediate sun gear 216 includes 19 carburized teeth and drives 281 intermediate planet gears which interengage and react against teeth of internal ring gear 288 of spindle 201A. See FIG. 2A.

Intermediate sun retaining ring 212 retains input sun gear 202F and input carrier 203A. Snap ring 220 and output carrier 204A retains the intermediate carrier 203A.

FIG. 2 illustrates a brake 208A. Inertia Dynamics Incorporated (hereinafter "IDI") manufactures the spring applied-coil energized to release brake described herein. The IDI brake is adapted to be mounted to the spindle of the gear reducer. Energized coil 230 in the brake 208A attracts ferromagnetic actuating plate 226 (sometimes referred to as the clapper) against the force of spring 264 and away from friction plate 225 to permit friction plate 225 to rotate with disconnect shaft 209. When coil 230 is actuated plate 226 abuts body 208A of the housing permitting rotation of the shaft 241 and of the shafts within the gearbox. Coil 230 is a direct current coil operable at 80 Volts direct current, 27 Watts. Wires supplying power to coil 230 are not illustrated in FIG. 2 or 2A.

Friction plate 225 includes friction material affixed thereto. Adhesive is used to affix the friction material to the friction plate. The friction material is located near the circumferential extent of the friction plate 225. When the brake is applied, spring 264 urges the actuating plate 226 against the friction plate 225 and, in particular, against the friction material affixed to the friction plate which prohibits rotation of the shaft 241. The brake is sealed 208C against the spindle 201A. See FIG. 2A to view seal 208C.

Referring to FIG. 2, motor 207A has a generally cylindrically shaped tapered exterior. Motor 207A is affixed to spindle 201A with bolts which are not illustrated. Spring 240 bears upon disconnect shaft 209 to enable disassembly of the device through removal of the cover assembly 206A, cover thrust washer 206B, and cover retaining ring 206G. Once the cover 206A, the thrust washer 206B, and cover retaining ring 206G are removed, internal disconnect rod 213 may be pushed inwardly and the cover may be reversed or flipped and reinstalled pushing disconnect rods 213, 209 leftwardly to disengage the motor and the gearbox from each other. Disconnect rod 213 is ordinarily used to support output sun gear. Motor shaft 241 is supported by bearings 242 at the generally leftward end of the motor and is supported by bearings 290 at the generally rightward end of the motor. Bearings 290 reside between stationary brake housing 208A and shaft 241 permitting rotation of the shaft with respect to the bearing housing. Brake 208A is affixed with bolts 261 to spindle 201A. Motor 207A is sealed 208C with O-rings to prevent the intrusion of water or dust at the joint of the spindle and motor. Brake 208A resides in the diametrical bore 296 of one end of the spindle 201A. Bearings 290 are tensioned and retained in place by spring 208E operable between ring 208D residing in a groove in an inner diametrical bore of the brake and the bearing 290. Spring 208E urges bearing 290 against a shoulder on the exterior of the shaft 241. Spindle 201A includes intermediate ring gear 288.

Input sun gear 210 is carburized and has 19 teeth. Input sun gear 210 is splined 272 to the disconnect shaft 209. Input carrier 202A is splined 273 to the intermediate sun gear 116 which in turn drives intermediate planet gears 203F. It will be noticed that FIG. 2 depicts input planet gears 202F which are as equally wide as the intermediate planet gears 203F which results in positioning the first and second planetary stages within ring gear 288 within spindle 201A. This saves axial space within the gearbox while effectively and efficiently transmitting power and torque.

Input seal 208F and brake O-ring 208C seal the gearbox from the motor preventing unwanted lubricating oil in the motor. Wheel hub 101D is affixed to output ring gear 201E with bolts 201M. Main lip seal 201B seals between the output ring gear 201E, hub 201D, and the spindle/input ring gear 201A. Main bearings 201C interengage wheel hub 201D and spindle 201A enabling rotation of the wheel hub 201D with respect to the spindle 201A which is affixed to the vehicle and is not rotatable. Bearing nut 201F and set screws 201G ensure that bearings 201C are secured against the spindle 201A. Seals such as O-ring seal 218 are used in the gearbox where necessary.

Intermediate gears 203F drive intermediate carrier 203A which is splined 274 to output sun gear 211. Carburized output sun gear 211 includes 25 teeth and drives 282 output planet gears 204F which interengage teeth 288A of the output ring gear 201E. There are four output planet gears. Output carrier 204A positions the output planet gears 204F and output planet pins 204E apart from the first (input stage) and the second (intermediate stage) and within the output ring gear 201E.

Output planet carrier 204A is stationary. Output planet gears 204F intermesh 288A with teeth of the output internal ring gear causing it to rotate and drive a wheel (not shown) affixed by studs 201M and nuts (not shown). Output planet thrust washers/plates 204B restrict the side to side movement of the output planet gears. Output planet spacer 204D and output planet needle rollers 204C support the output planet gears and enable rotation of the output planet gears with respect to the output planet roll pins 204E. Output planet pins 204G secure the output planet roll pins 204E to the stationary output planet carrier.

An intermediate carrier 203A interengages the output sun gear 211. Intermediate planet thrust plates 203B secure the intermediate planet gears 203F longitudinally. Bushings 203C are interposed between the input planet gears 202F and the input planet pins 202E. Bushings 203C are interposed between the intermediate planet gears 203F and the intermediate planet pins 203E.

Planet output carrier 204A is secured with pins 204G to the planet output pins 204E. Output planet thrust washers/plates 204B secures the output planet gears 204F against longitudinal movement. Output planet spacer 204D separates output planet needle roller bearings which are interposed between the interior of the output planet gears 204F and the output pins 204E to enable rotation of the output gears with respect to the output pins. Cover assembly 206A is retained by the cover retaining ring. Cover thrust washer 206B interengages output sun gear 211 driven by the intermediate carrier 203A.

A Sauer AC electric motor 207A drives splined disconnect shaft 209 which in turn drives the input sun gear 210 which in turn drives the input planet gears 202F. The motor housing 207A is, of course affixed to the spindle 201A.

The examples of FIGS. 1 and 2 are different. FIG. 2 illustrates a spacer 269 and an "L" shaped sleeve between motor 207A and forged spindle/input ring gear 269 in an opening in the large spacer/cover 269S. FIG. 1 utilizes a different motor 107A which is IP 67 rated. It will be noticed that brake 208A is housed partially within the diametrical bore 296 in the end of spindle 201A. In FIG. 1 plates 124, 126 and friction plate 125 are housed within the diametrical bore 196 in the end of spindle 101A and housing 108A primarily resides between windings 123 of the motor and the motor shaft 141A. FIG. 1 also employs a narrow input planet gear 102F which together with the reverse orientation of the brake provides a motor-brake-reducer combination which is shorter in language. The advantage of the narrower input stage is that the intermediate stage gearing can be wider. The intermediate stage gearing is wider in the first example. Spindle 101A and spindles 201A have the same profiles.

FIG. 2 illustrates a motor-brake-reducer combination which is longer than the motor-brake-reducer combination of FIG. 1 due to the orientation of the brake outside the motor windings 223 and the wider input planet gear 202F. Because the brake does not fit within the motor, a spacer 269 and an "L" shaped sleeve between motor 207A and forged spindle/input ring gear 269 reside in an opening in the large spacer/cover 269S near a wiring harness leading to the exterior of the motor. FIG. 2 illustrates the spacer 269 and the "L" shaped sleeve 269A extending longitudinally along the axis of the device about the thickness of the pressure plates 224, 226 and the friction 225.

Figure 3:
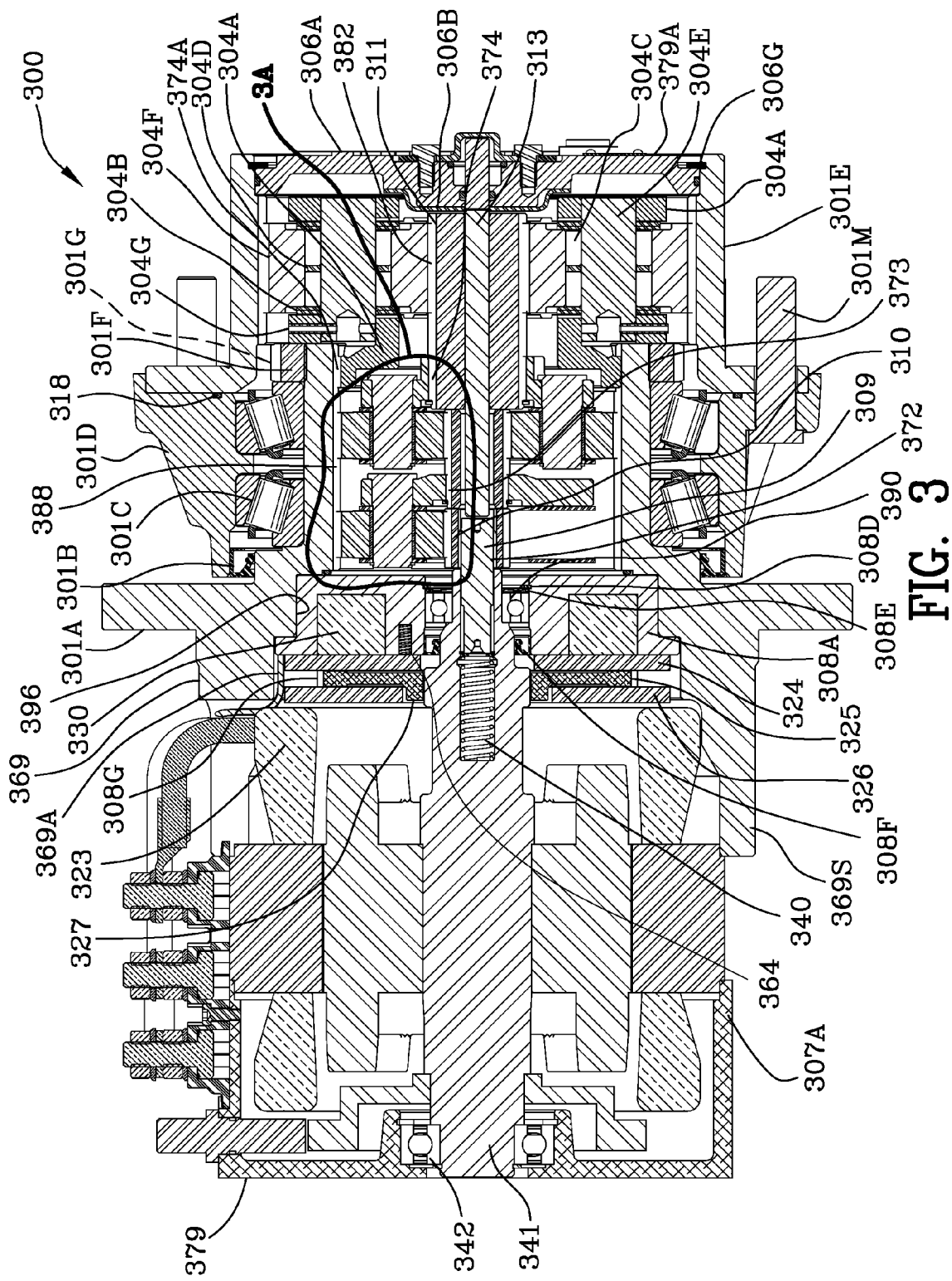
FIG. 3 is a cross-sectional assembly view of another example of the motor-brake-gear reducer.
Figure 3A:
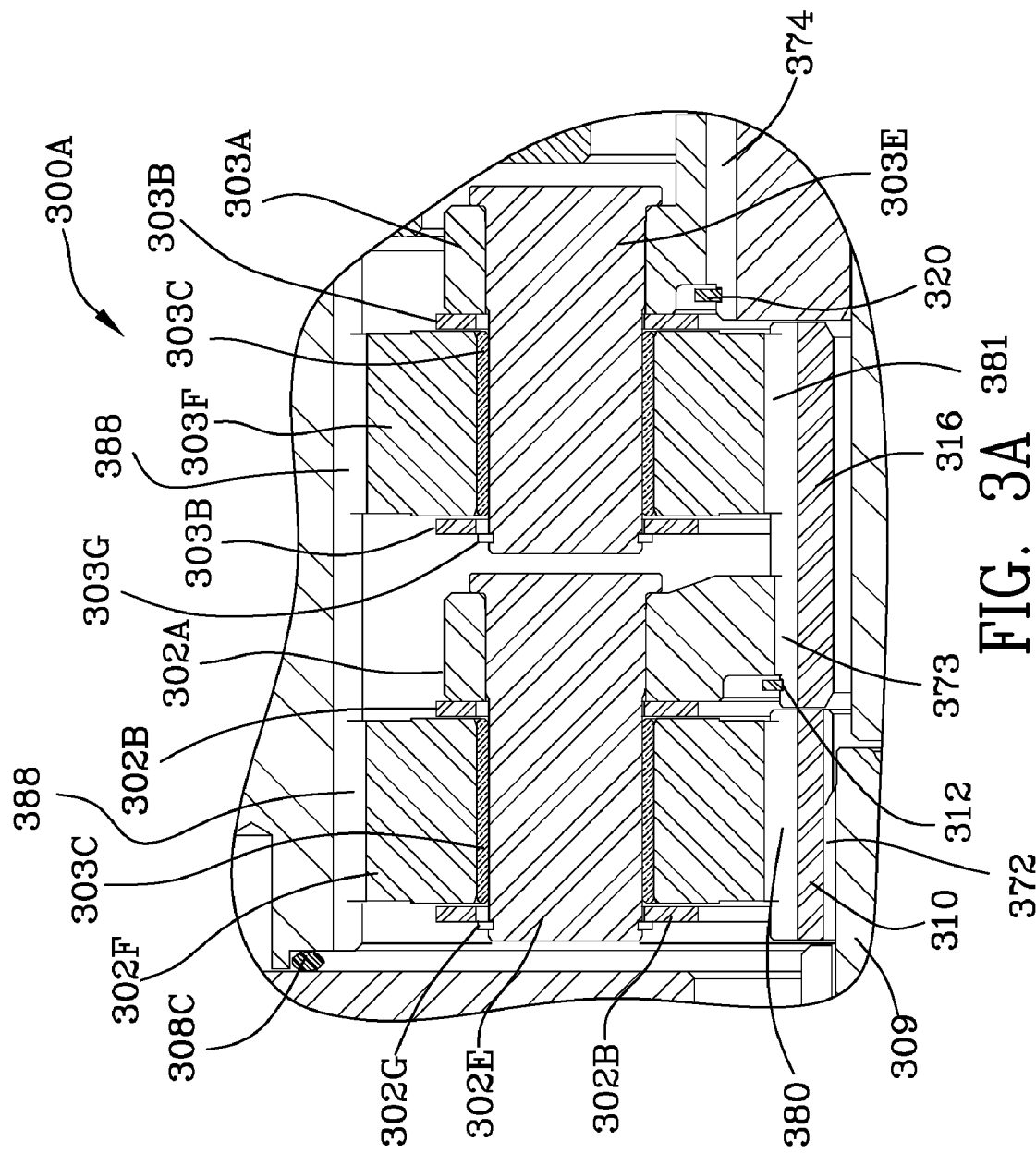
FIG. 3A is an enlargement of a portion of FIG. 3 illustrating the input planet gears and intermediate planet gears.
Figure 3B:
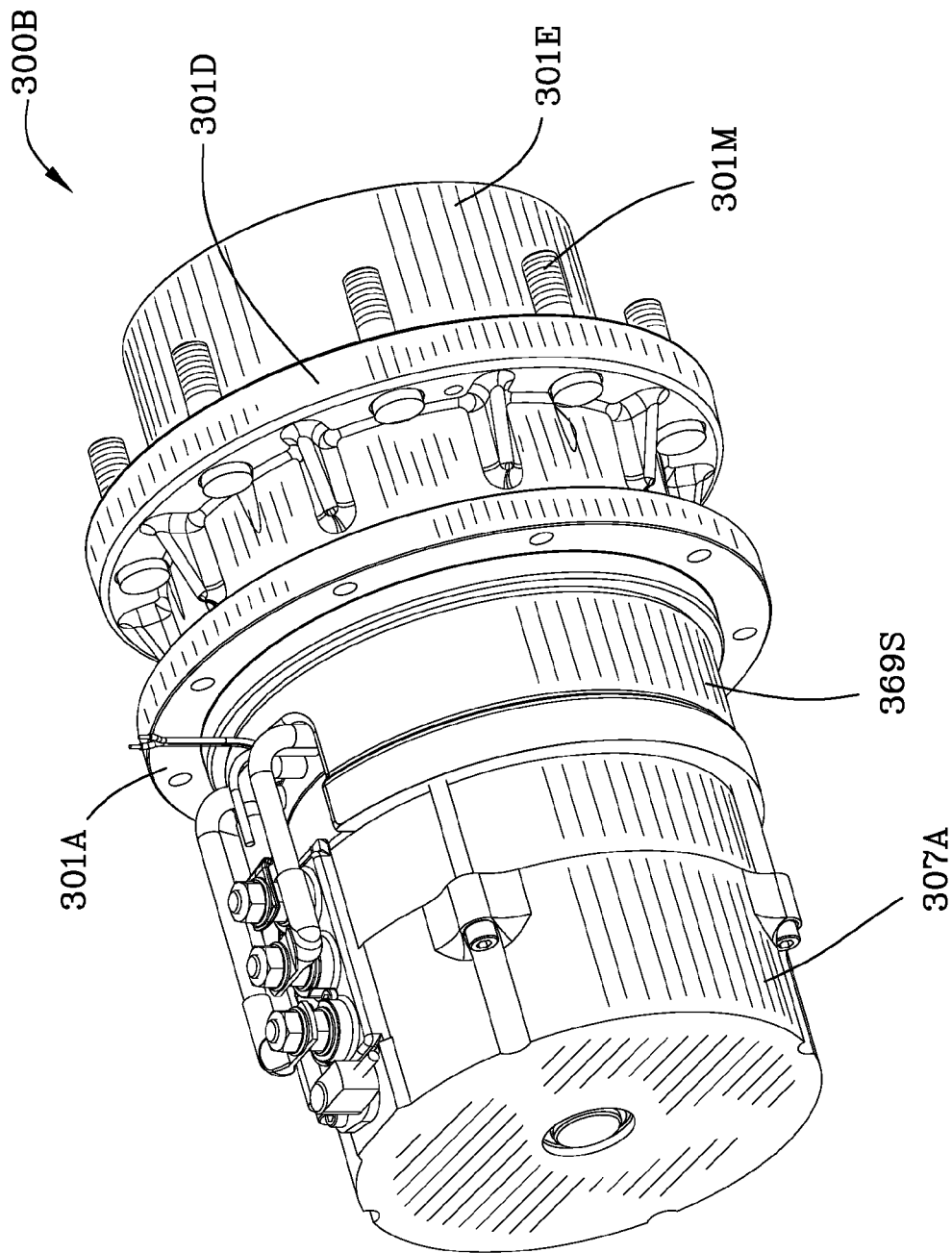
FIG. 3B is an outside perspective view of the example illustrated in FIGS. 3 and 3A.

FIG. 3 is a cross-sectional assembly view 300 of another example of the motor-brake-gear reducer which is identical in many respects to the example set forth in FIGS. 2 and 2A. Reference numerals in the 200 series in FIGS. 2 and 2A denote the same structure as reference numerals in the 300 series in FIGS. 3, 3A and 3B except where discussed herein. FIG. 3A is an enlargement 300 of a portion of FIG. 3 illustrating the input planet gears 301F and intermediate planet gears 303F. FIG. 3A is included for completeness and is identical to FIG. 2. FIG. 3 illustrates a motor-brake-reducer combination which is slightly longer than the example illustrated in FIG. 1 due to the orientation of the brake outside the motor windings 323 and due to the use of the Sauer 207A motor. Because the brake does not fit within the motor 307A, an integral spacer 369 and an "L" shaped sleeve 369A resides between motor 307A and forged spindle/input ring gear 369 and an opening in the large spacer/cover 369S near a wiring harness leading to the exterior of the motor exists. Motor 307A is affixed to spindle 101A with bolts which are unnumbered in FIG. 3B. FIG. 3 illustrates the integral spacer 369 and the "L" shaped sleeve 369A extending longitudinally along the axis of the device about the thickness of the pressure plates 324, 326 and the friction 325. FIG. 3B is an outside perspective view of the example illustrated in FIGS. 3 and 3A. A Sauer AC electric motor 307A drives splined disconnect shaft 309 which in turn drives the input sun gear 310 which in turn drives the input planet gears 302F. The motor housing 307A is, of course affixed to the spindle 301A.

Figure 4:
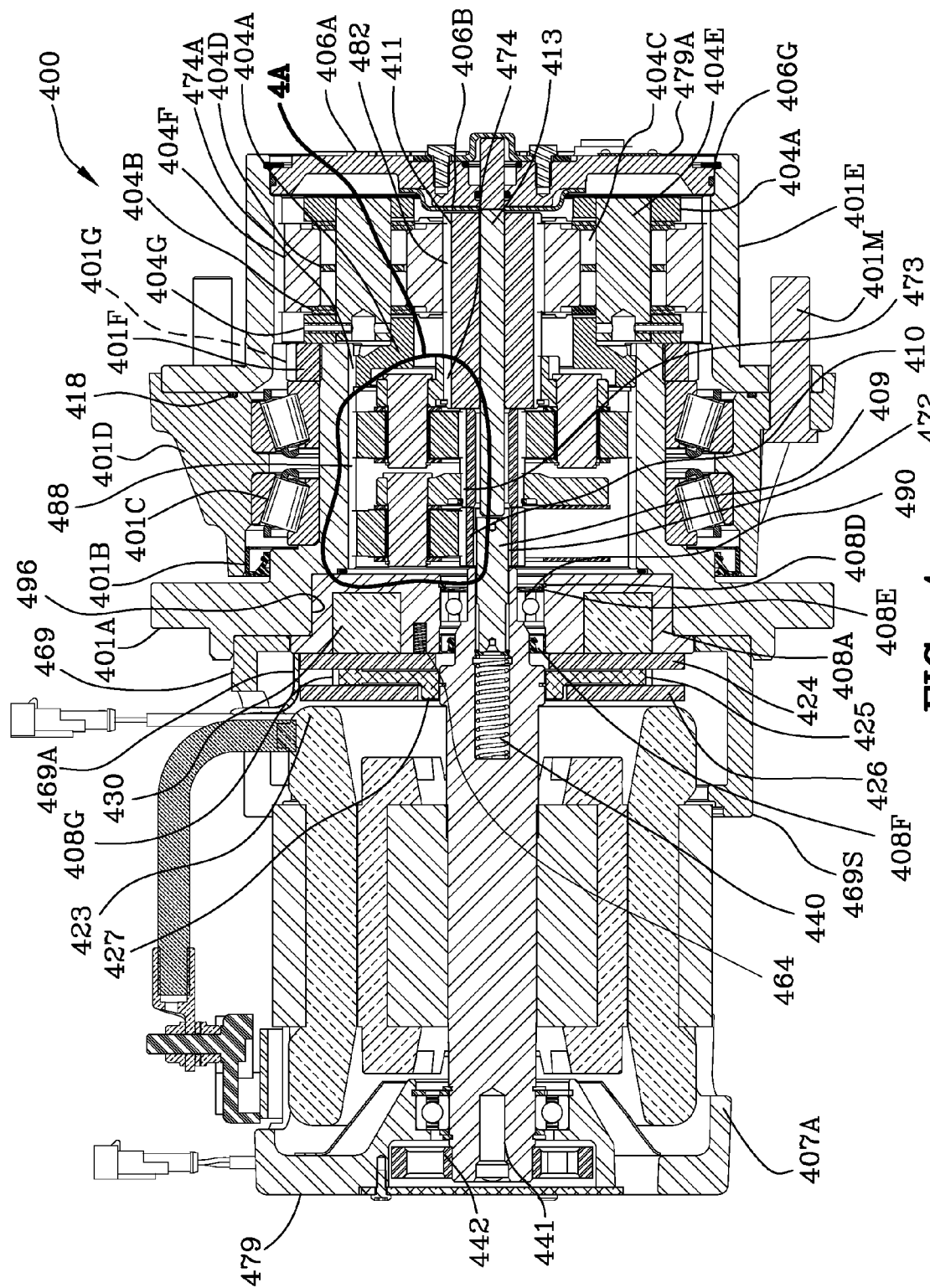
FIG. 4 is a cross-sectional assembly view of another example of the motor-brake-gear reducer.
Figure 4A:
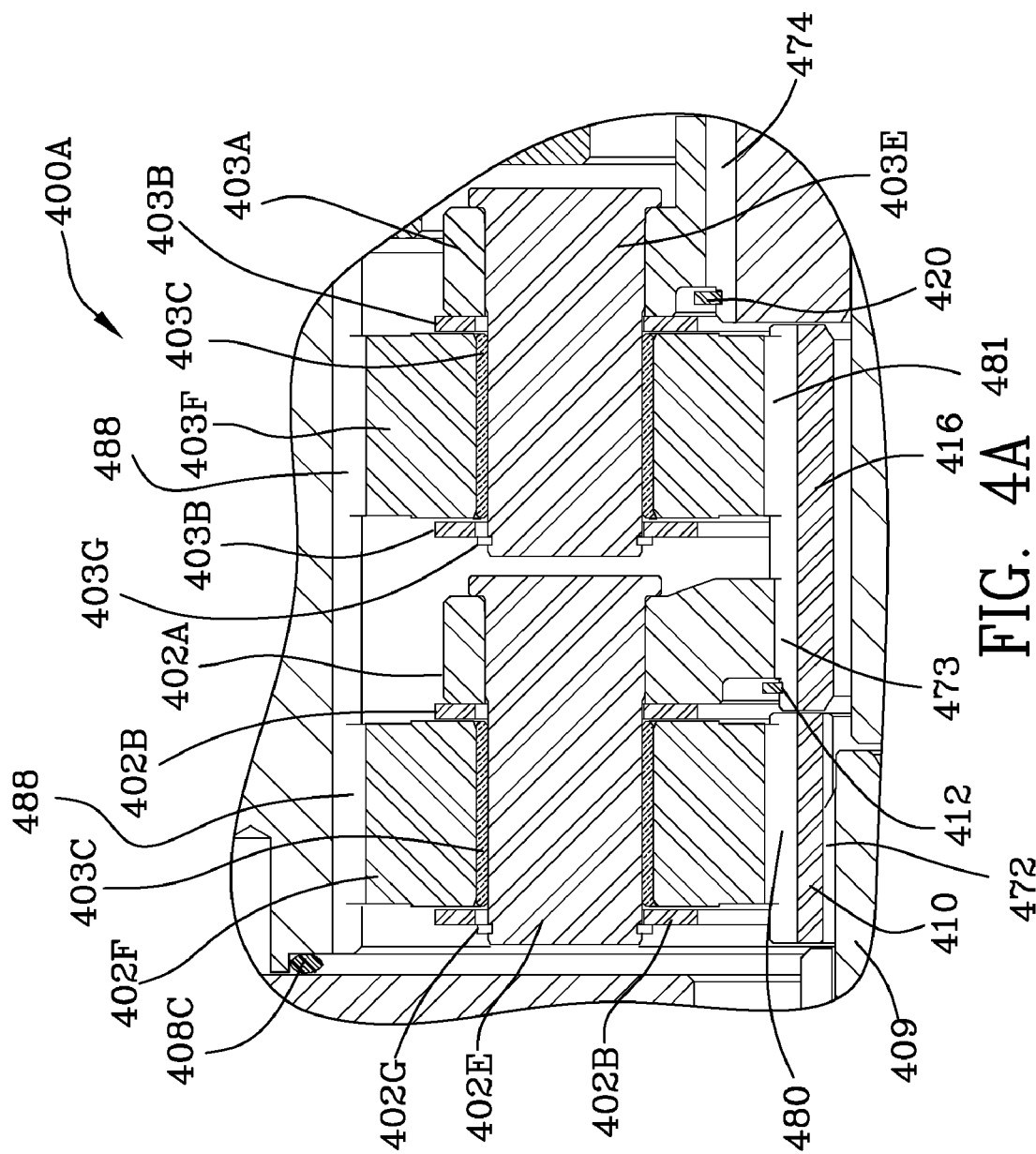
FIG. 4A is an enlargement of a portion of FIG. 4 illustrating the input planet gears and intermediate planet gears.
Figure 4B:
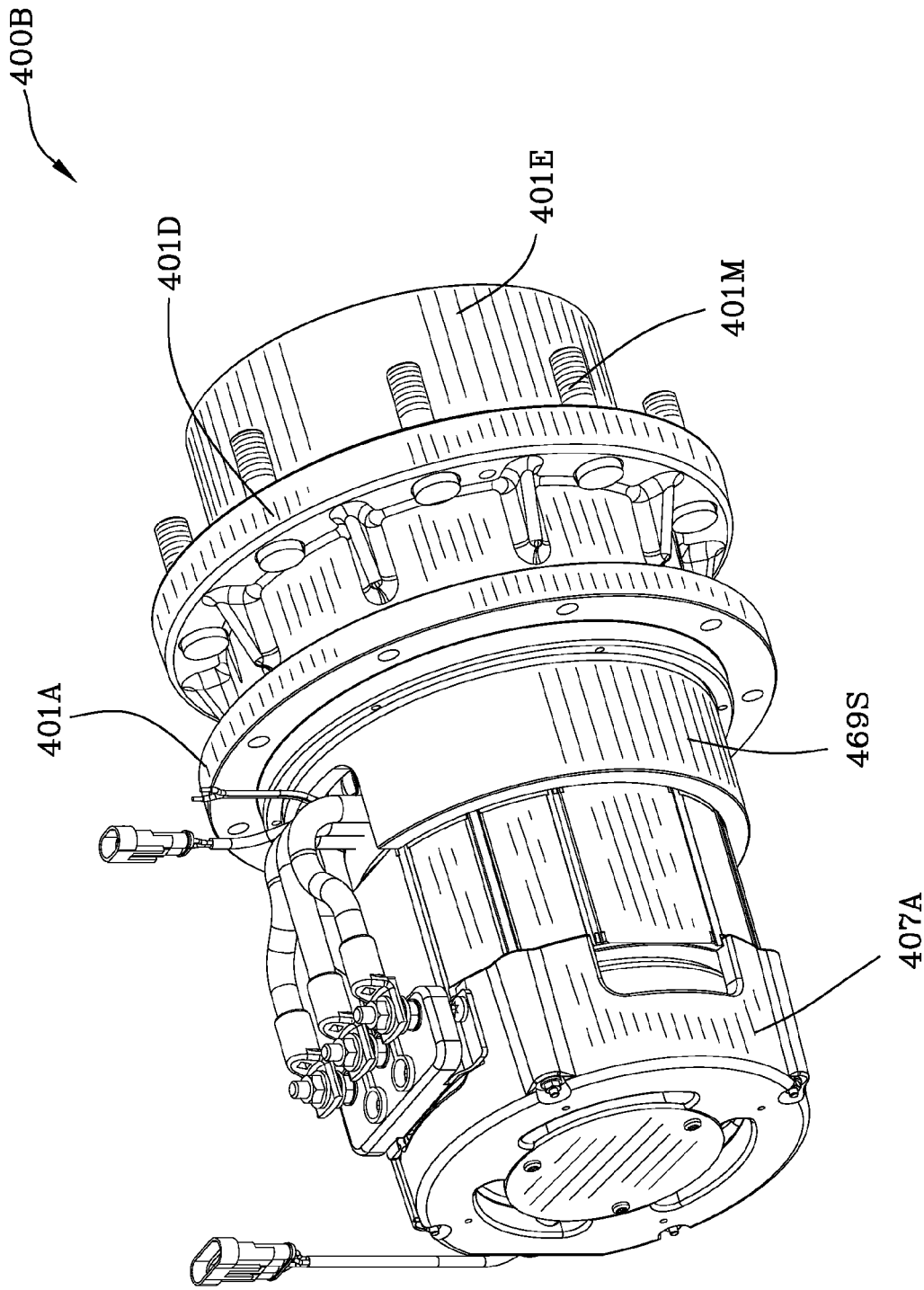
FIG. 4B is an outside perspective view of the example illustrated in FIGS. 4 and 4A.

FIG. 4 is a cross-sectional assembly view 400 of another example of the motor-brake-gear reducer. FIG. 4A is an enlargement 400 of a portion of FIG. 4 illustrating a portion of the brake 408A. FIG. 4B is an outside perspective view 400B of the example illustrated in FIGS. 4 and 4A. FIG. 4 is a cross-sectional assembly view 400 of another example of the motor-brake-gear reducer which is identical in many respects to the example set forth in FIGS. 2 and 3. Reference numerals in the 200 and 300 series in regard to the respective FIGS. 2, 2A and 3, 3A and 3B and denote the same structure as reference numerals in the 400 series in FIGS. 4, 4A and 4B except where discussed herein. FIG. 4A is an enlargement 400 of a portion of FIG. 4 illustrating the input planet gears 401F and intermediate planet gears 403F. FIG. 4A is included for completeness and is identical to FIGS. 2A and 3A. FIG. 4 illustrates a motor-brake-reducer combination which is slightly longer than that shown in FIG. 1 due to the orientation of the brake 408A outside the motor windings 423 and the Danaher motor 408A. Because the brake does not fit within the motor, a spacer 469 and an "L" shaped sleeve 469A reside between motor 407A and forged spindle/input ring gear 401A. Motor 407A is affixed to spindle 401A with bolts which are unnumbered in FIG. 4B. An opening in the large spacer/cover 469S near a wiring harness leading to the exterior of the motor is also shown but is unnumbered. FIG. 4 illustrates the integral spacer 469 and the "L" shaped sleeve 469A extending longitudinally along the axis of the device and is about the same as the thickness of the pressure plates 424, 426 and the friction 425. FIG. 4B is an outside perspective view 400B of the example illustrated in FIGS. 4 and 4A. A Danaher AC electric motor 407A drives splined disconnect shaft 409 which in turn drives the input sun gear 410 which in turn drives the input planet gears 402F. The motor housing 407A is, of course, affixed to the spindle 401A.

The operation of FIGS. 2, 3 and 4 of the gear set and the brake is the same as described in connection with the example of FIG. 1 except as described herein. FIG. 1 is the preferred example and due to the geometry of the various components and their arrangement is the most compact and efficient motor-brake-gear reducer.

The overall length of the example of FIG. 1 from left side motor covering 179 to the right side motor covering 179A is approximately 16 inches. Similarly, the overall length of the example of FIGS. 2 and 3 from left side motor covering 279, 379 to the right side motor covering 279A, 379A is approximately 16.3 inches. Similarly, the overall length of the example of FIG. 4 from the left side motor covering 479 to the right side motor covering 479A is approximately 16.6 inches.

A Danaher AC electric motor 407A drives splined disconnect shaft 409 which in turn drives the input sun gear 410 which in turn drives the input planet gears 402F. The motor housing 407A is, of course affixed to the spindle 401A. All of the motors 107A, 207A and 307A are 6 horsepower motors.

In general, all gearing, bearings, planet gear shafts, are made of carburized steel while the carriers and housings are made from ductile iron or steel. The input stage carrier is made out of through hardened steel. The spindle is made from gray iron/forged steel/steel alloy and the motor housings are aluminum.

In general there are three input planets, three intermediate planets, and three or four output planets depending on the gearbox rating required for the application. Other configurations as to the number of gears for each stage may be employed.

REFERENCE NUMERALS

100—cross-sectional view of torque hub with brake located partially within the electric motor
100A—enlargement of a portion of FIG. 1
100B—enlargement of a portion of FIG. 1A
100C—enlargement of a portion of FIG. 1C
101A—forged spindle/input ring gear
101B—main lip seal
101C—series main bearings
101D—hub
101E—output ring gear
101F—series bearing nut
101G—bearing nut set screw
101M—studs
102A—input carrier
102B—input thrust plates
102D—input planet bushing
102E—input planet pins
102F—input planets, 35 t, carburized
102G—input planet pin retaining rings
103A—double wall intermediate carrier
103B—intermediate planet thrust washers
103C—input/intermediate planet bushings
103E—intermediate planet pins
103F—intermediate planet gear
103G—intermediate carrier roll pin
104A—4-planet output carrier
104B—output planet thrust washer
104C—output planet needle rollers
104D—output planet spacer
104E—output planet pins
104F—output planet gear, 46 t
104G—output planet roll pins
106A—cover assembly
106B—cover thrust washer
106G—cover retaining ring
107A—Advanced 72V AC motor, IP67 protection rating
107C—motor O-ring
108A—electric brake
108C—brake O-ring
108D—brake retaining ring
108E—bearing pre-load spring
108F—input seal
109—splined disconnect shaft
110—input sun gear, 19 t, carburized
111—output sun gear, 25 t, carburized
112—intermediate sun retaining ring
113—internal disconnect rod
116—intermediate sun gear, 19 t, carburized
118—output ring gear o-ring
120—thrust spacer between input & intermediate carrier
123—electric motor winding end turns
124—pressure plate
125—friction plate
125A—friction material affixed by adhesive to friction plate
126—actuating plate
128—motor speed controls
129—water seal for electrical wires
130—coils in brake
140—thrust spring
141—motor shaft
141A—motor shaft
142—bearings
160—threaded bolt for affixing the brake to the forged spindle/input ring gear
161—spacer between electromagnetic coil and the pressure plate, one of three
162—interengagement of the pressure plate against the forged spindle/input ring gear
163—passageway in the friction plate 125
163A—threaded interconnection with spindle 101A
163P—passageway in ferromagnetic plate 126
163Q—passageway in plate 124
164—spring, one of three
169—gap between inner coil housing 108A and inner plate 126 when coil is de-energized
171—spline interconnecting motor shaft and disconnect shaft
172—spline interconnecting disconnect shaft 109/input sun gear 110
173—spline interconnecting input carrier 102A
174—spline interconnecting intermediate carrier 103A and output sun 111
178—splined
179, 279, 379, 479—left side motor covering
179A, 279A, 379A, 479A—right side motor covering
180—intermeshing of input sun gear and input planet gears
181—intermeshing of intermediate input sun 116 and intermediate planet gears 103F
182—intermeshing of output sun and output planet gears
188—internal ring gear of spindle 101A
189—bushing operating between disconnect rod 113 and output sun gear 111
190—bearings supporting motor shaft 141A
196—diametrical bore in end of spindle 101A
197—space between end of the motor windings 123 and motor shaft 141/141A
199—bolt affixing the body of the brake 108A, the spacer and the plate 124 to the spindle 101A
200—cross-sectional view of torque hub with brake
200A—enlargement of a portion of FIG. 2
201A, 301A, 401A—spindle/input ring gear (forging)
201B, 301B, 401B—main lip seal
201C, 301C, 401C—main bearings
201D, 301D, 401D—hub
201E, 301E, 401E—output ring gear
201F, 301F, 401F—bearing nut
201G, 301G, 401G—bearing nut set screw
201M, 301M, 401M—studs
202A, 302A, 402A—input carrier
202B, 302B, 402B—input thrust plates
202E, 302E, 402E—input planet pins
202F, 302F, 402F—input planets, 35 t, carburized
202G, 302G, 402G—input planet pin retaining rings
203A, 303A, 403A—double wall intermediate carrier
203B, 303B, 403B—intermediate planet thrust plates
203C, 303C, 403C—input/intermediate planet bushings
203E, 303E, 403E—intermediate planet pins
203F, 303F, 403F—intermediate planet gear
203G, 303G, 403G—intermediate carrier roll pin
204A, 304A, 404A—4 planet output carrier 204B, 304B, 404B—output planet thrust washers/plate
204C, 304C, 404C—output planet needle rollers
204D, 304D, 404D—output planet spacer
204E, 304E, 404E—output planet pins
204F, 304F, 404F—output planet gear, 46 t
204G, 304G, 404G—output planet roll pins
206A, 306A, 406A—cover assembly
206B, 306B, 406B—cover thrust washer
206G, 306G, 404G—cover retaining ring
207A, 307A, 407A—Sauer motor
208A, 308A, 408A—electric brake
208C, 308C, 408C—brake O-ring
208D, 308D, 408D—brake retaining ring
208E, 308E, 408E—bearing pre-load spring
208F, 308F, 408F—input seal
208G, 308G, 408G—standoff/interconnection between outer plate 226 and electric brake
208A/coil 230
209, 309, 409—splined disconnect shaft
210, 310, 410—input sun gear, 19 t, carburized
211, 311, 411—output sun gear, 25 t, carburized
212, 312, 412—intermediate sun retaining ring
213, 313, 413—internal disconnect rod
216, 316, 416—intermediate sun gear, 19 t, carburized
218, 318, 418—output ring gear O-ring
220, 320, 420—thrust spacer between input & intermediate carrier
221, 321, 421—disconnect retaining ring
222, 322, 422—disconnect washer, outside diameter 0.524; inside diameter, 0.286; thickness, 0.047;
223, 323, 423—electric motor winding end turns
224, 324, 424—pressure plate
225, 325, 425—brake friction
226, 326, 426—plate
230, 330, 430—coil in brake
240, 340, 440—spring
241, 341, 441—motor shaft
242, 342, 442—motor bearing
261—spacer between electromagnetic coil and the pressure plate, one of three
264, 364, 464—spring
269, 469—extension of forged spindle/input ring gear (forging)
269A, 369A, 469A—"L" shaped sleeve
269S, 369S, 469S—large spacer/cover
272, 372, 472—spline interconnecting disconnect shaft 209/309/409 input sun gear 210/310/410
273, 373, 473—spline interconnecting input carrier 202A
274, 374, 474—spline interconnecting intermediate carrier 203A/303A/404A and output sun 211/311/411
274A, 374A, 474A—spline interconnecting output carrier with spindle
281, 381, 481—intermeshing of intermediate input sun and intermediate planet gears
288, 388, 488—internal ring gear of spindle 201A/301A/401A
290, 390, 490—bearings supporting motor shaft
296, 396, 496—internal diameter of spindle 201A/301A/401A
300—cross-sectional view of torque hub
300A—enlargement of a portion of FIG. 3
300B—perspective view of the torque hub
369—integral extension of the spindle
400—cross-sectional view of torque hub
400A—enlargement of a portion of FIG. 4
400B—perspective view of the torque hub The invention has been set forth by way of example. Those skilled in the art will readily recognize that changes may be made to the invention without departing from the spirit and the scope of the appended claims.

The invention claimed is:

1. A compact gear reducer electric motor assembly, comprising:
an internal brake;
a high speed electric motor interconnected with a gear reducer having substantial gear reduction;
said high speed electric motor includes a shaft and windings, said windings of said electric motor are radially spaced from said shaft creating a space between said shaft and said windings of said motor, said internal brake mounted substantially radially between said shaft and said windings of said electric motor, and, said internal brake being operable against a spring biasing said brake into engagement with ground;
said gear reducer includes a stationary spindle;
said brake electrically actuated to permit transmission of energy to said gear reducer;
said gear reducer includes input, intermediate and output planetary stages;
said stationary spindle includes a first ring gear;
said input and intermediate planetary stages residing within said stationary spindle and engaging said first ring gear;
said gear reducer includes an output ring gear, said output ring gear being rotatable with respect to said stationary spindle; and,
said output planetary stage of said gear reducer drives said rotatable output ring gear.

2. The compact gear reducer electric motor assembly as claimed in claim 1, further comprising releasing means for releasing said output ring gear from said brake allowing rotation thereof.

3. The compact gear reducer electric motor assembly as claimed in claim 2 wherein said releasing means includes an electromagnetic coil.

4. The compact gear reducer electric motor assembly as claimed in claim 1 wherein said electric brake resides substantially within said space between said shaft and said windings.

5. The compact gear reducer electric motor assembly as claimed in claim 4 wherein said input planetary stage includes an input planet sun gear and planet gears, said planet gears of said input stage having a first width, said intermediate planetary stage includes an intermediate sun gear and intermediate planet gears, said intermediate planet gears having a second width, said first width of said input stage being less than one-half the width of said intermediate planet gears having said second width.

6. A compact gear reducer electric motor assembly, comprising:
a high speed electric motor interconnected with a gear reducer having a gear reduction, said gear reduction in the range of 1:90 to 1:160;
said high speed electric motor includes a housing and motor windings;
an internal brake, said internal brake includes a housing, said housing of said internal brake further includes a spring mounted therein and an electromagnetic coil;
said high speed electric motor includes a shaft and windings, said windings of said electric motor are radially spaced from said shaft creating a space between said shaft and said windings of said motor, and said internal brake mounted substantially radially between said shaft and said windings of said high speed electric motor;

said gear reducer includes a stationary spindle and a disconnect shaft, said disconnect shaft transmitting energy of said high speed electric motor to said gear reducer;

said internal brake affixed to said stationary spindle, said internal brake further includes first and second pressure plates, said first and second pressure plates each include a passageway therethrough, a spacer residing between said first and second plates, and a friction plate affixed to said disconnect shaft and rotatable therewith;

said friction plate is generally disk-shaped having first and second sides and includes frictional material affixed to said first and second sides of said friction plate;

said spring of said brake operable between said housing of said brake and said first pressure plate, said pressure plates being ferromagnetic and attractable by said coil of said brake when said coil is energized, said spring urging said first pressure plate into engagement with said friction plate when said coil is deenergized;

said internal brake electrically actuated to permit transmission of energy to said gear reducer;

said gear reducer includes input, intermediate and output planetary stages;

said stationary spindle includes a first ring gear;

said input and intermediate planetary stages residing within said stationary spindle and engaging said first ring gear;

said gear reducer includes an output ring gear, said output ring gear being rotatable with respect to said stationary spindle; and, said output planetary stage of said gear reducer drives said rotatable output ring gear.

7. The compact gear reducer electric motor assembly as claimed in claim 6 wherein said electric brake resides substantially within said space between said shaft and said windings.

8. The compact gear reducer electric motor assembly as claimed in claim 7 wherein said input planetary stage includes an input planet sun gear and planet gears, said planet gears of said input stage having a first width, said intermediate planetary stage includes an intermediate sun gear and intermediate planet gears, said intermediate planet gears having a second width, said first width of said input stage being less than one-half the width of said intermediate planet gears having said second width.

* * * * *